(12) United States Patent
Iino

(10) Patent No.: US 6,964,390 B2
(45) Date of Patent: Nov. 15, 2005

(54) CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 145 days.

(21) Appl. No.: 10/649,783

(22) Filed: Aug. 28, 2003

(65) Prior Publication Data

US 2004/0045850 A1   Mar. 11, 2004

(30) Foreign Application Priority Data

Aug. 30, 2002   (JP)   .............................. 2002-255108

(51) Int. Cl.$^7$ .......................................... G11B 23/107
(52) U.S. Cl. ...................... 242/348; 242/347; 360/132
(58) Field of Search .............................. 242/341, 347, 242/348, 348.2; 360/132, 133

(56) References Cited

U.S. PATENT DOCUMENTS

| | | | |
|---|---|---|---|
| 3,458,157 A | * | 7/1969 | Wells .......................... 242/341 |
| 3,617,013 A | * | 11/1971 | Ainslie et al. ............... 242/348 |
| 5,264,987 A | | 11/1993 | Doodson et al. |
| 5,367,421 A | * | 11/1994 | Shiba et al. ................. 360/132 |
| 5,504,644 A | * | 4/1996 | Sasaki et al. ................ 360/132 |
| 6,175,471 B1 | * | 1/2001 | Meguro ....................... 360/133 |
| 6,854,679 B2 | * | 2/2005 | Hiraguchi .................... 242/348 |
| 6,866,216 B2 | * | 3/2005 | Hiraguchi ................. 242/348.2 |

* cited by examiner

Primary Examiner—William A. Rivera

(74) Attorney, Agent, or Firm—Sughrue Mion, PLLC

(57) ABSTRACT

A cartridge is provided with a case, which accommodates a recording medium at an interior thereof, and a label area, which is surrounded by a rectangular standing wall at an outer face of the case. At one side of the standing wall, a longitudinal direction portion is cut away. Thus, a cut-away portion which is continuous with the label area is provided. The label area is formed at a rear wall, at a rear side in a direction of loading the case into a drive device. The cut-away portion is formed at a substantially central portion, in a longitudinal direction, of an upper side of the standing wall.

18 Claims, 7 Drawing Sheets

CARTRIDGE

CROSS-REFERENCE TO RELATED APPLICATION

This application claims priority under 35 USC 119 from Japanese Patent Application No. 2002-255108, the disclosure of which is incorporated by reference herein.

BACKGROUND OF THE INVENTION

1. Field of the Invention

The present invention relates to a cartridge which accommodates a recording medium in a case and is provided with a write-protect function which switches between a state in which recording of information to the recording medium is enabled and a state in which recording is disabled.

2. Brief Description of the Related Art

Cartridges which accommodate recording media in cases are used as external recording media for computers and the like. Specifically, a cartridge has a structure in which a recording medium, such as a recording tape wound on a reel, a disc-form disc medium or the like, is rotatably accommodated in a case which has been formed to be hollow by matching peripheral walls of an upper case and a lower case together with one another.

Such a cartridge may be provided with a label area, at which a label is adhered to an outer face of the case of the cartridge. Commonly, details of what is recorded on the recording medium and the like (for example, a title and the like) are written on the label. The label area is formed, for example, by depressing (recessing) an upper face or rear face of the case in a substantially rectangular shape. Thus, an outer edge portion of the label area is surrounded by a peripheral wall. A user of the cartridge can adhere the label at a predetermined position and, because the label is positioned inside the peripheral wall (at the label area which is a recessed portion), the label will not protrude beyond the case.

However, with a conventional cartridge as described above, the shape and size of the label area are specified to substantially correspond to the shape and size of the label. Thus, spaces between the peripheral wall surrounding the label area and an outer edge portion of the label are narrow. Consequently, there is a problem in that labels that have been adhered are difficult to peel off.

Accordingly, enlarging the label area relative to the label has been considered. However, when the label area is enlarged, positioning accuracy of the label deteriorates. Moreover, because the label area is a thin wall portion of the case, enlarging the label area is not preferable with regard to strength. Furthermore, a label area which is provided at a rear face side of a case is generally formed to span substantially the whole of the rear face, and there is very little free space available for enlargement.

SUMMARY OF THE INVENTION

In consideration of the circumstances described above, an object of the present invention is to provide a cartridge at which peeling off of a label that has been adhered to a label area is easy, while a function of positioning the label at the label area is maintained.

A first aspect of the present invention provides a cartridge comprising: a case accommodating a recording medium therein; and a label area surrounded by a rectangle-like standing wall at an outer face of the case, wherein a portion in a longitudinal direction of one side portion of the standing wall is excised to provide a cut-away portion, which communicates with the label area, at the case.

At the cartridge described above, because the cut-away portion which is continuous with the label area is provided, by excising the standing wall surrounding the label area (defining outer edges of the label area), a label that has been adhered to the label area can be easily peeled from the case.

The cut-away portion is formed at a portion in the longitudinal direction in one of the side portions of the standing wall. That is, the one side portion is not excised and opened up across the whole length thereof. Thus, the rectangular label area is enclosed from four sides by the standing wall. In consequence, a label can be accurately positioned in the label area.

Thus, with this cartridge, peeling off of a label that has been adhered to the label area is easy, while the function of positioning the label at the label area is maintained.

The label area may be disposed at the rear wall of the case. Hence, information marked on the label can be visually confirmed from the rear face side, for example, at a time of loading of the cartridge to a drive device, in a state in which the cartridge is accommodated at a holder of a library apparatus, and the like.

The cut-away portion may be excised and provided at a central portion of an upper side portion of the standing wall surrounding the label area (a long side portion of the label area provided at the rear wall). Therefore, the cut-away portion can be specified to be relatively large, and the cut-away portion can be distanced from corner portions of the label (portions which are susceptible to peeling). Thus, with this cartridge, ease of peeling of the label is improved, but unintended peeling off of the label is prevented.

The cut-away portion of the case may be provided to be continuous with an upper face of the case. That is, the cut-away portion opens to upward of the case. Hence, an upper end (thickness portion) of a label adhered to the label area is exposed upward through the cut-away portion. Thus, with this cartridge, peeling off of a label which has been adhered to the label area is even easier.

A second aspect of the present invention provides a cartridge comprising: a case including an upper case and a lower case and accommodating a recording medium therein; and a label area surrounded by a rectangle-like standing wall at an outer face of the case, wherein a portion in a longitudinal direction of one side portion of the standing wall is excised to provide a cutaway portion, which communicates with the label area, at the case.

DETAILED DESCRIPTION OF THE INVENTION

A recording tape cartridge 10 relating to an embodiment of the present invention will be described on the basis of FIGS. 1 to 7. First, general overall structure of the recording tape cartridge 10 and structures of an opening and a door will be described. Thereafter, a label area 60, which is a principal element of the present invention, will be described. For the sake of convenience of explanation, a loading direction of the recording tape cartridge 10 into a drive device, which is shown by arrow A, is taken to be a forward direction (front side) of the recording tape cartridge 10, and the direction of an arrow B, which intersects arrow A, is taken to be a rightward direction.

Overall Structure of Recording Tape Cartridge

Figure 1:
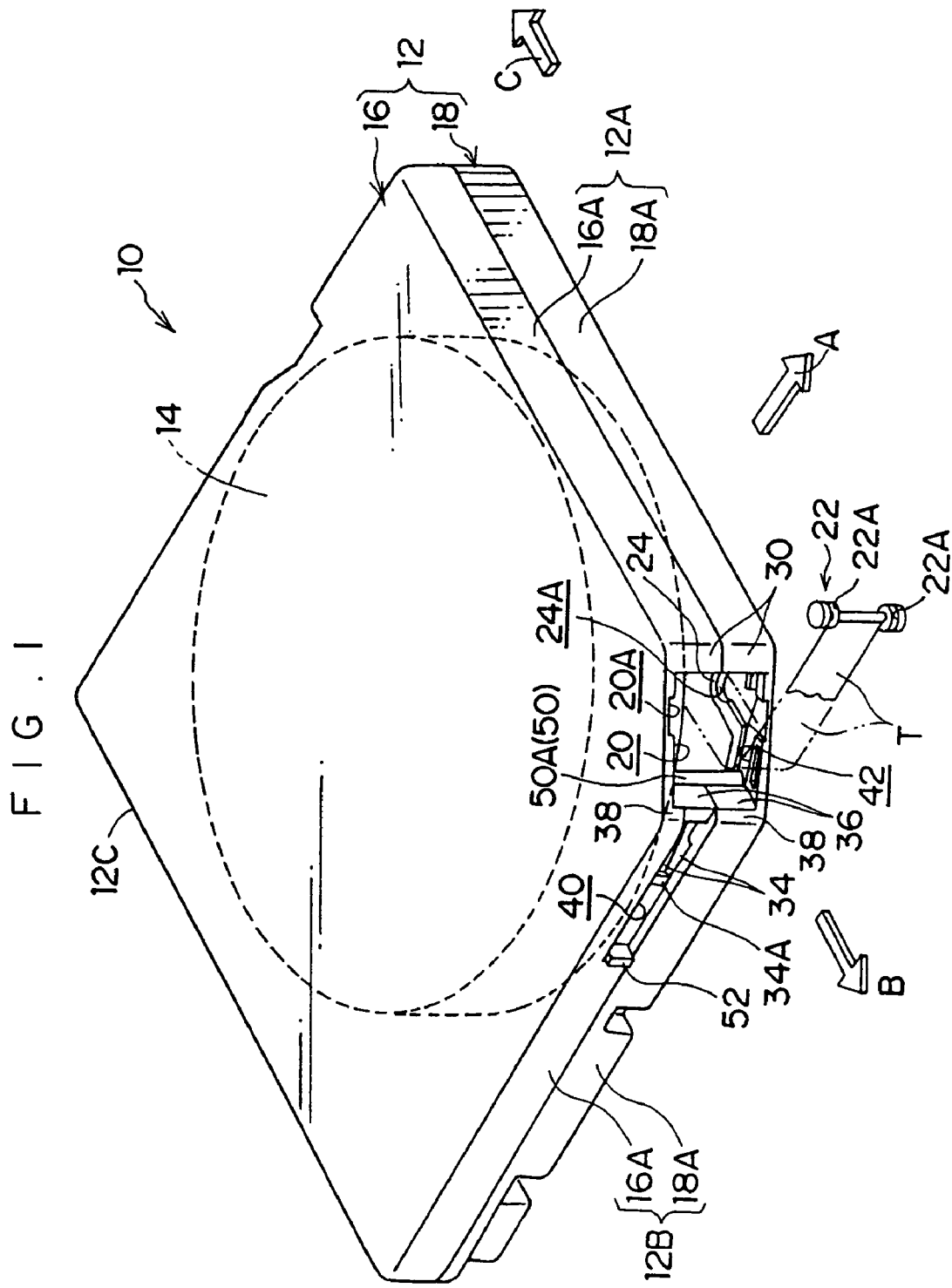
FIG. 1 is a perspective view showing overall structure of a recording tape cartridge relating to an embodiment of the present invention.
Figure 2:
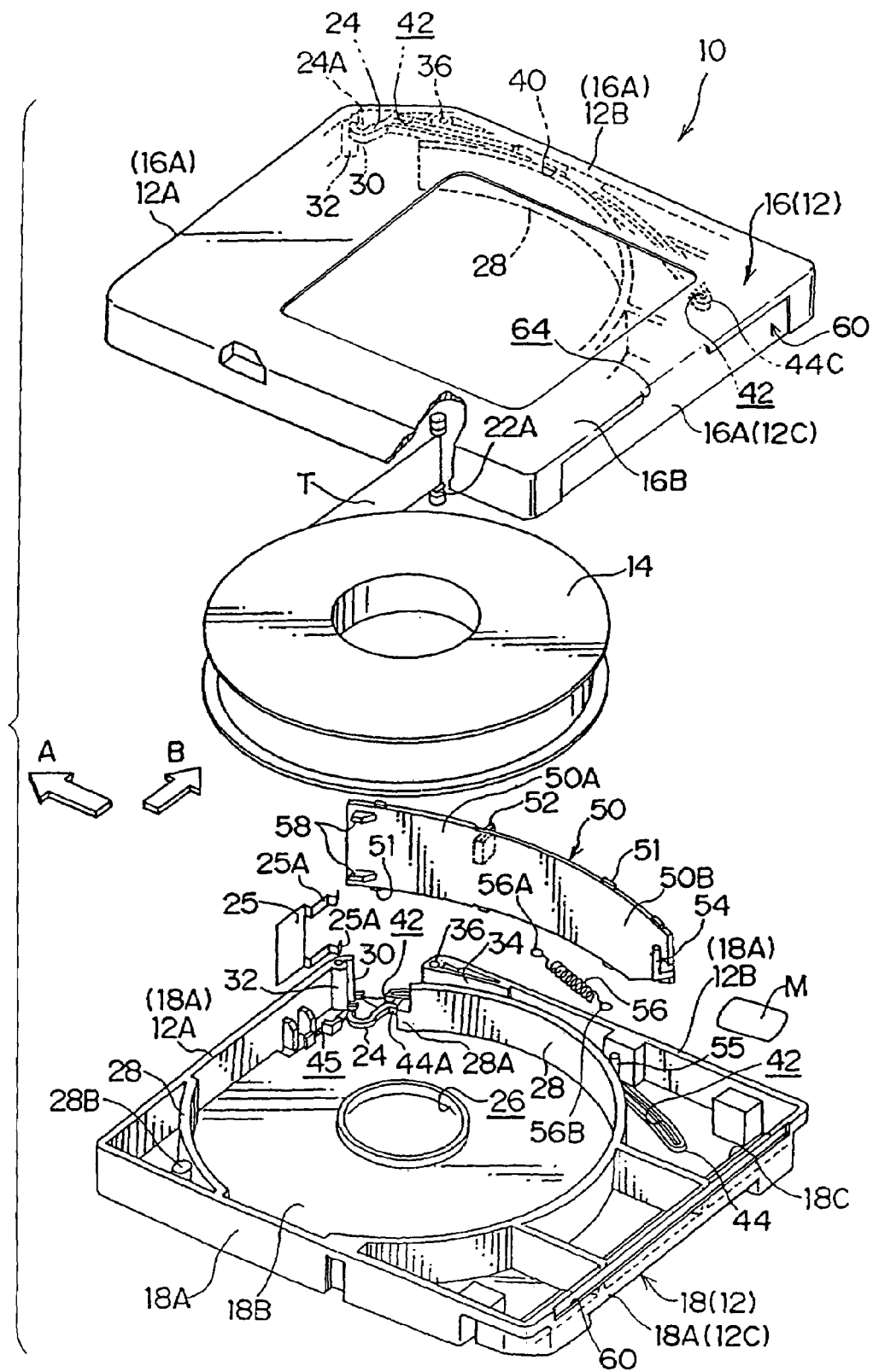
FIG. 2 is an exploded perspective view showing the recording tape cartridge relating to the embodiment of the present invention.

A perspective view of the overall structure of the recording tape cartridge 10 is shown in FIG. 1 and, a schematic exploded perspective view of the recording tape cartridge 10 is shown in FIG. 2.

As shown in FIGS. 1 and 2, the recording tape cartridge 10 is structured to rotatably accommodate a single reel 14 in a case 12, which is substantially rectangular in plan view. A magnetic tape T is wound on the reel 14. The magnetic tape T serves as a recording tape which is an information recording/playback medium.

The case 12 is structured by matching up and joining respective peripheral walls 16A and 18A of an upper case 16 and a lower case 18 to one another. A front-right corner portion of each of the upper case 16 and the lower case 18, which is a single corner portion at a front end side in the direction of loading into the drive device, is excised. An accommodation space for the reel 14, on which the magnetic tape T is wound, is provided inside the case 12. The excised corner portions of the peripheral walls 16A and 18A of the upper case 16 and the lower case 18 serve as an opening 20 for drawing out the magnetic tape T. Detailed structures of the opening 20 and a door 50, which opens and closes the opening 20, are described later.

A leader pin 22 is connected at a free end of the magnetic tape T which is to be drawn out through the opening 20. The leader pin 22 is anchored (engaged) by a drawing-out mechanism of the drive device, and subjected to a drawing-out operation. At each of two end portions of the leader pin 22, which protrude beyond width direction end portions of the magnetic tape T, an annular groove 22A is formed. These annular grooves 22A are anchored by hooks or the like of the drawing-out mechanism. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms which open in the direction of arrow B, and both the end portions of the leader pin 22 are held at recess portions 24A of the pin stands 24 in a state in which the leader pin 22 is standing thereat. The pin stands 24 are provided continuously with ribs 44, which are described later.

A leaf spring 25 is fixedly disposed in a vicinity of the pin stands 24. The leaf spring 25 engages with the upper and lower end portions of the leader pin 22, and holds the leader pin 22 at the pin stands 24. The leaf spring 25 has a structure in which an arm portion 25A resiliently deforms as appropriate to allow movement of the leader pin 22 when the leader pin 22 is removed or inserted at the pin stands 24.

A gear opening 26 is formed at a central portion of the lower case 18. The gear opening 26 is for exposing a reel gear (not shown) of the reel 14 to the outside. Through the gear opening 26, the reel gear meshes with a driving gear of a drive device, and the reel 14 is driven to rotate inside the case 12. Further, the reel 14 is held by play-restricting walls 28 so as not to rattle about. The play-restricting walls 28 are provided projecting at inner faces of the upper case 16 and the lower case 18 to serve as interior walls along portions of a circular path which is coaxial with the gear opening 26.

A hollow portion 28A is provided continuously at an end portion of the play-restricting walls 28 in a vicinity of the opening 20. A hole for regulation of position is formed inside the hollow portion 28A. In addition, a hollow portion 28B is standingly provided at a space which is sandwiched between the play-restricting walls 28 and a front-left corner portion of the case 12. Another hole for regulation of position, which is a long hole, is formed in the hollow portion 28B. The hollow portions 28A and 28B are disposed co-linearly along the direction of arrow B. Except at the end portion at which the hollow portion 28A is continuously provided, each of the play-restricting walls 28 is provided to be continuous with the peripheral wall 16A or the peripheral wall 18A of the case 12. Thus, an outer side of the play-restricting walls 28 is set apart from the space for disposing the reel 14.

A memory board M is disposed at a rear-right portion of the lower case 18. The memory board M stores various kinds of information for each individual recording tape cartridge 10. A portion of an angled rear wall 18C, which structures the peripheral wall 18A, is inclined to the extent of a predetermined angle and the memory board M is disposed to be inclined at the predetermined angle. Hence, the memory board M can be detected at a drive device, which reads the various kinds of information stored at the memory board M from a lower face side, and at a library apparatus, which reads the same from a rear face side.

Structure of Opening and of Case at Opening Vicinity

Figure 3:
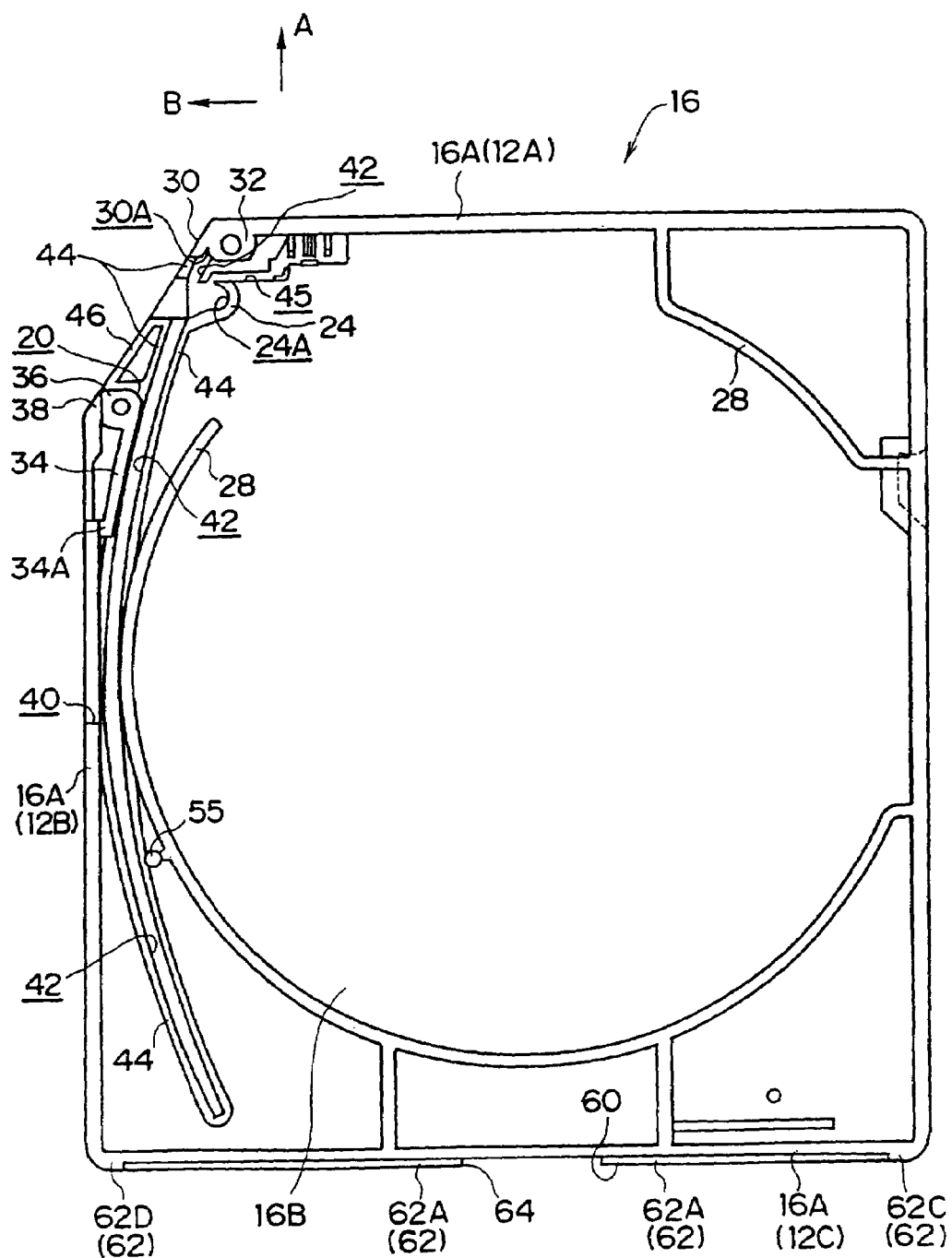
FIG. 3 is a bottom view showing an upper case which structures the recording tape cartridge relating to the embodiment of the present invention.
Figure 4:
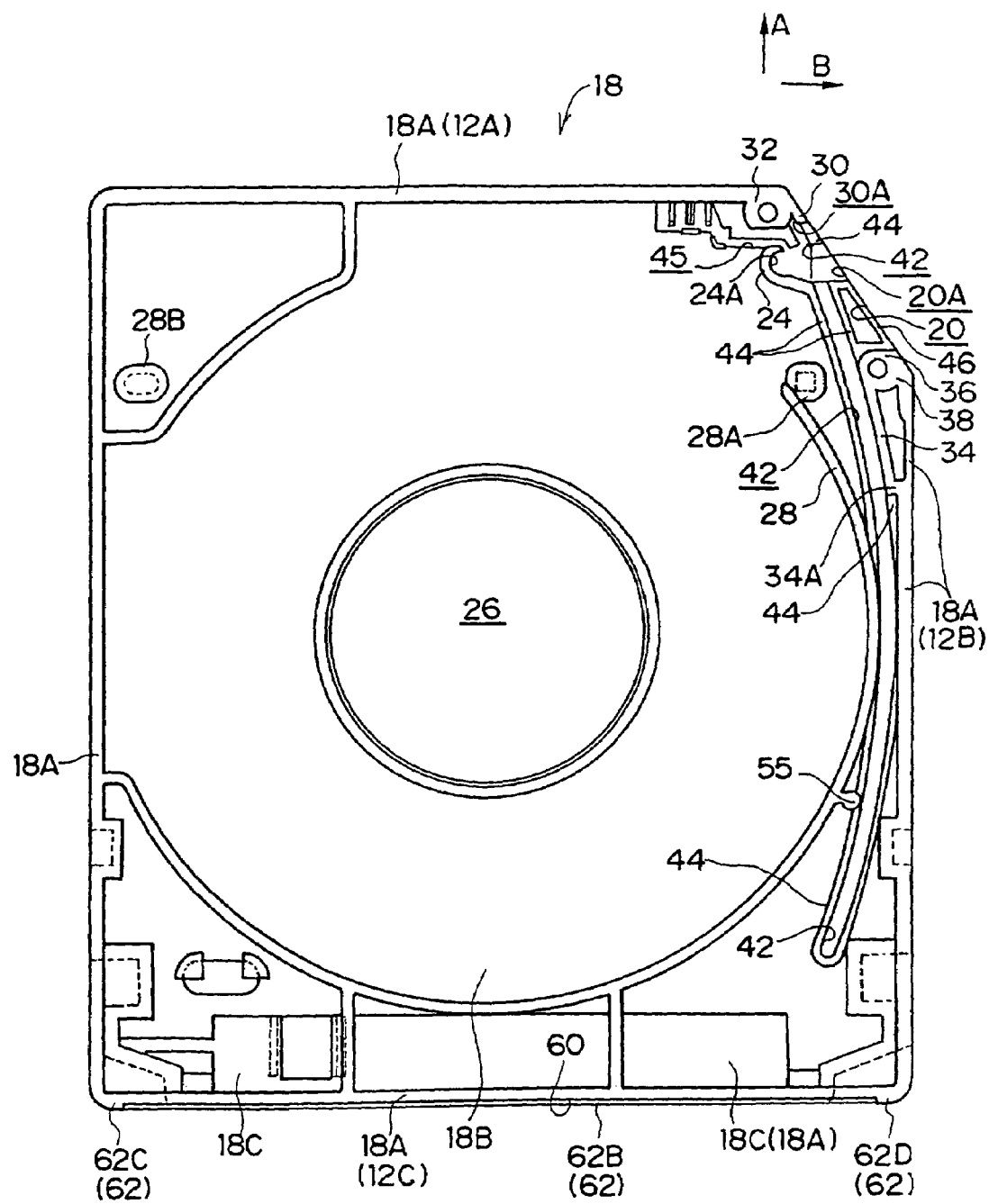
FIG. 4 is a plan view showing a lower case which structures the recording tape cartridge relating to the embodiment of the present invention.

As shown in FIG. 3, which is a bottom view of the upper case 16, and FIG. 4, which is a plan view of the lower case 18, respective pairs of upper and lower screw bosses 32 and 36 are provided at front and rear edge portions of the opening 20. Together with other screw bosses, which are not shown, the screw bosses 32 and 36 are for screw-fixing to join the upper case 16 and the lower case 18 together.

The pair of screw bosses 32, which is disposed at the front edge portion of the opening 20, is provided continuously with both a right end portion of a front wall 12A of the case 12 (a portion of the peripheral walls 16A and 18A whose outer surface faces in the direction of arrow A) and a pair of short upper and lower anti-dust walls 30 which is inflected along an opening face of the opening 20 from the right end portion of the front wall 12A. A recess portion 30A is formed between the screw bosses 32 and the anti-dust walls 30. A distal end portion of the door 50, which is described later, enters into the recess portion 30A.

At the screw bosses 36, which are disposed at the rear edge portion of the opening 20, a front end portion of a right wall 12B of the case 12 (a portion of the peripheral walls 16A and 18A which runs along the direction of arrow A) is provided continuously with both an inflected wall 38, which is inflected to run substantially along the opening face of the opening 20, and a front end portion of a pair of upper and lower circular arc walls 34, which is provided at an inner side of the right wall 12B. The upper and lower circular arc walls 34 are each formed in a circular arc shape substantially corresponding, in plan view, to an outer peripheral face of the later-described door 50 (and to a movement path of the door 50). The circular arc walls 34 respectively protrude to the extent of a predetermined length beyond the screw bosses 36. A rear end portion of the circular arc walls 34 is provided continuously with the right wall 12B (the peripheral wall 16A and the peripheral wall 18A) via a short joining wall 34A.

A slit 40 is formed in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by excising a lower portion of the peripheral wall 16A that structures the right wall 12B and excising a lower portion of the inflected wall 38 of the upper case 16. Thus, the slit 40 also opens forward.

Guide grooves 42 for guiding the door 50 are provided at the upper case 16 and lower case 18 structuring the case 12. Groove walls of the respective guide grooves 42 are structured by the ribs 44, which are provided standing from a ceiling plate 16B of the upper case 16 and a floor plate 18B of the lower case 18, by the right wall 12B (the peripheral wall 16A and the peripheral wall 18A), and by the play-restricting walls 28. Thus, the guide grooves 42 are formed without reducing thickness of the ceiling plate 16B and the floor plate 18B. The ribs 44 are provided to be continuous with the pin stands 24.

Each of the guide grooves 42 is formed in a circular arc shape along a predetermined circular circumference. The recess portion 30A serves as an end portion of the guide grooves 42, and the guide grooves 42 reach therefrom to a rear-right corner portion of the case 12. The predetermined circular circumference is determined such that the guide grooves 42 pass (thread) between the right wall 12B and the play-restricting walls 28 at an outer side of the screw bosses 32 and at an inner side of the screw bosses 36. In the present embodiment, a center point of the predetermined circular circumference (a center of rotation of the later-described door 50) is specified to have a position (coordinate) in a left-right direction which is at an outer side relative to a left end of the case 12 and a position (coordinate) in the front-rear direction which substantially corresponds to a center of rotation of the reel 14 (which is at the center of the play-restricting walls 28).

At portions of the guide grooves 42 which are located at the opening 20, the guide grooves 42 are communicated with the recess portions 24A by excising the ribs 44 to the right of the pin stands 24, and the guide grooves 42 are communicated with a spring groove 45, at which the arm portion 25A of the leaf spring 25 is disposed. At the excised portion of the guide grooves 42, a tapering opening 20A, which guides the leader pin 22 into the case 12, communicates with the recess portions 24A of the pin stands 24. Ribs 46 are provided continuously with the ribs 44. The ribs 46 are formed along each of a rear edge of the tapering opening 20A, a front edge of the screw bosses 36, and the opening face of the opening 20. Thus, the strength of surroundings of the opening 20 of the case 12 is preserved or improved.

The ribs 44 that structure rear half portions of the guide grooves 42 curve back on themselves and are closed off in substantial "U" shapes at rear ends thereof. The rib 44 of the upper case 16 is formed to be longer toward the rear than the rib 44 of the lower case 18. The purpose of this is to prevent interference between the door 50 and the memory board M that is disposed at the right wall 12B side of the angled rear wall 18C (of the peripheral wall 18A), which is a surface inclined at the predetermined angle.

A pair of upper and lower spring-engaging pins 55 are provided at a length direction central portion of an inner side portion of a rear half portion of the ribs 44. The spring-engaging pins 55 are provided continuously with the play-restricting walls 28 of the upper case 16 and the lower case 18. Of the spring-engaging pins 55, the lower case 18 side spring-engaging pin 55 is formed to protrude further, and a portion thereof which protrudes further up than the lower case 18 side play-restricting wall 28 is a structure at which an annular portion 56A of one end of a coil spring 56, which is described later, hooks on. Hence, the upper case 16 side spring-engaging pin 55, which is shorter, matches up with the lower case 18 side spring-engaging pin 55, and disengagement of the coil spring 56 is prevented.

In a state in which the peripheral walls 16A and 18A of the upper case 16 and lower case 18 described above are matched together, unillustrated screws are screwed into the screw bosses 32, 36 and the other screw bosses from the lower side, and the screw bosses are fixed or joined to structure the case 12. Here, because the opening 20 is formed by excising the front-right corner portion, the opening face of the opening 20 faces in the direction of arrow A and in the direction of arrow B. Therefore, the drawing-out mechanism of the drive device can gain access to chuck the leader pin 22 from the direction of arrow A, the direction of arrow B, or a direction between the directions of arrow A and arrow B. As a result, an area in which the pin stands 24 that hold the leader pin 22 can be disposed is larger, and a range from which the drawing-out mechanism of the drive device can chuck the leader pin 22 is wide. Accordingly, a disposition position of the pin stands 24 can be specified to suit specifications of drive devices that carry out chucking from the direction of arrow A and of drive devices that carry out chucking from the direction of arrow B. Thus, a degree of freedom of design of the drive devices is broadened.

Structure of Door

The opening 20 described above is opened and closed by the door 50, which serves as a covering member. The door 50 is curved in a plate thickness direction thereof and is formed in a circular arc form whose curvature substantially coincides, in plan view, with curvature of the guide grooves 42 (the predetermined circular circumference). A portion of the door 50 at a front portion thereof (i.e., at least a portion which closes off the opening 20) is formed with a plate breadth, i.e., height, which is substantially the same as an opening height of the opening 20, and serves as a closing portion 50A. A portion which is rearward relative to the closing portion 50A, at which the plate breadth is made slightly smaller, serves as a driven portion 50B.

Figure 5A:
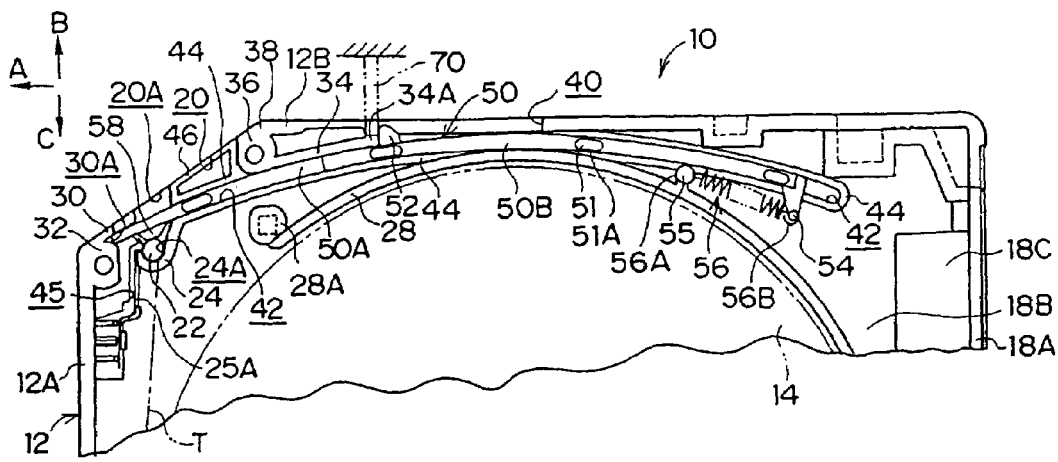
FIG. 5A is a plan view showing an opening process of an opening of the recording tape cartridge relating to the embodiment of the present invention, viewed with the upper case removed, which shows an initial state of engagement of an engaging projection of a drive device with an operation projection of a door.

A plate length of the door 50 (the curved length dimension) is determined such that, in a state in which the opening 20 is closed, a rear end portion of the driven portion 50B is disposed inside the rear-right corner portion of the case 12 (see FIG. 5A). A lower portion of the rear side of the driven portion 50B is cut away at an angle, in order to avoid the memory board M which is provided at the inclined surface of the angled rear wall 18C of the lower case 18.

This door 50 is a structure which closes the opening 20 in a state in which a distal end portion of the closing portion 50A enters into the recess portion 30A located at the outer side of the screw bosses 32 (see FIG. 5A). The door 50 moves or rotates substantially rearward along the guide grooves 42 to open the opening 20 (see FIG. 5B). When an outer peripheral face of a distal end vicinity of the closing portion 50A reaches a vicinity at an inner side of the screw bosses 36, the opening 20 is completely opened (see FIG. 5C). When the opening 20 has been opened, the door 50 closes the opening 20 by rotating substantially in the opposite direction.

Accordingly, the door 50 is formed to be curved so as to open and close the opening 20 by rotating without deviating from the predetermined circular circumference, which is a movement path thereof. The center of rotation and radius of the door 50 (the shape of the guide grooves 42) can be suitably determined in accordance with positions of the front and rear edge portions of the opening 20 (the screw bosses 32 and 36), which are determined by requirements of the drive device, and in accordance with the angle of the plane of the opening of the opening 20, which is determined by requirements of the library apparatus, and the like.

A plurality of protrusion portions 51 are protrudingly provided at upper and lower ends of the door 50 and enter into the upper and lower guide grooves 42, respectively. The protrusion portions 51 have different protrusion heights from the closing portion 50A and the driven portion 50B, but distances from a center line along the length direction of the door 50 to peak portions of the respective protrusion portions 51 are uniform. Thus, the upper and lower protrusion portions 51 slide against the ceiling plate 16B and floor plate 18B, which are floor portions of the guide grooves 42.

Protrusions 51A are protrudingly provided at the protrusion portions 51, at both sides thereof in the plate thickness direction of the door 50. Peak portions of the protrusions 51A are in line with the plate thickness direction faces of the door 50. The protrusions 51A slide against the groove walls of the guide grooves 42 (the ribs 44 and the like). The protrusion portions 51 that are located furthest toward the front are disposed so as not to enter into the tapering opening 20A, which communicates with the guide grooves 42, during the opening/closing process of the opening 20.

Because of the protrusion portions 51 and the protrusions 51A, the door 50 is a structure which reliably slides so as to be guided at the guide grooves 42 without deviating from the aforementioned movement path when opening/closing the opening 20, being threaded between the right wall 12B and the play-restricting walls 28, at the outer side of the screw bosses 32 and the inner side of the screw bosses 36.

At an outer peripheral portion of the door 50, at a front end vicinity of the driven portion 50B (the closing portion 50A side thereof), the operation projection 52 is provided projecting along a radial direction of the door 50, to serve as an operation portion. The operation projection 52 is exposed to the outside of the case 12 through the slit 40. With this structure, when the recording tape cartridge 10 is loaded into a drive device, the operation projection 52 engages with an engaging protrusion 70 of the drive device, which advances in through the portion of the slit 40 that opens frontward, and the door 50 is moved in the direction of opening the opening 20 by relative movement of the recording tape cartridge 10 and the drive device.

A spring-holding portion 54, which has the form of a substantial "L" shape toward an inner face side of the door 50, is protrudingly provided at a rear end portion of the driven portion 50B of the door 50. The spring-holding portion 54 has a free end at an upper end side thereof. The coil spring 56, which serves as an urging mechanism, is engaged and retained at the spring-holding portion 54. Specifically, the annular portion 56A and an annular portion 56B are provided at end portions of the coil spring 56 for engagement thereof. The annular portion 56A is passed through the spring-engaging pins 55 of the case 12 and is engaged and retained at the case 12, and the annular portion 56B is passed through the spring-holding portion 54 and is engaged and retained at the door 50.

Therefore, with this structure, the door 50 is urged in the direction of closing the opening 20 by urging force of the coil spring 56, and the door 50 continuously closes the opening 20. The coil spring 56 has a length that reaches the rear-right corner portion of the case 12 in the state in which the door 50 closes the opening 20 as described above. Thus, the coil spring 56 is disposed to effectively utilize a space between the play-restricting walls 28 and the peripheral walls 16A and 18A (and the angled rear wall 18C) at the rear-right corner portion.

Stoppers 58, which abut against an upper end portion side face and a lower end portion side face of the leader pin 22 when the opening 20 is closed, are protrudingly provided at the inner face of the closing portion 50A of the door 50. Thus, detachment of the leader pin 22 from the pin stands 24 by an impact, when the recording tape cartridge 10 is dropped or the like, can be reliably prevented.

Figure 5B:
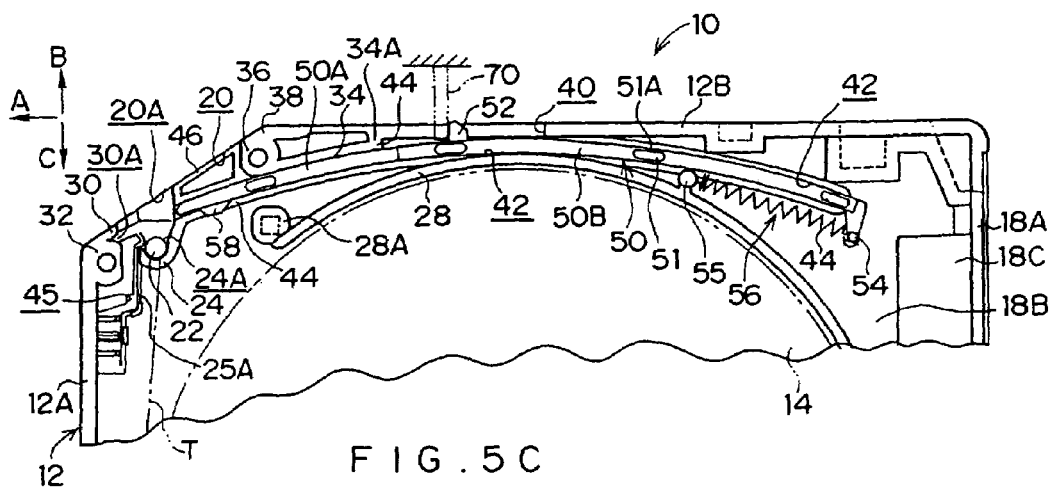
FIG. 5B is a plan view showing a state during the opening of the opening of the recording tape cartridge of FIG. 5A.
Figure 5C:
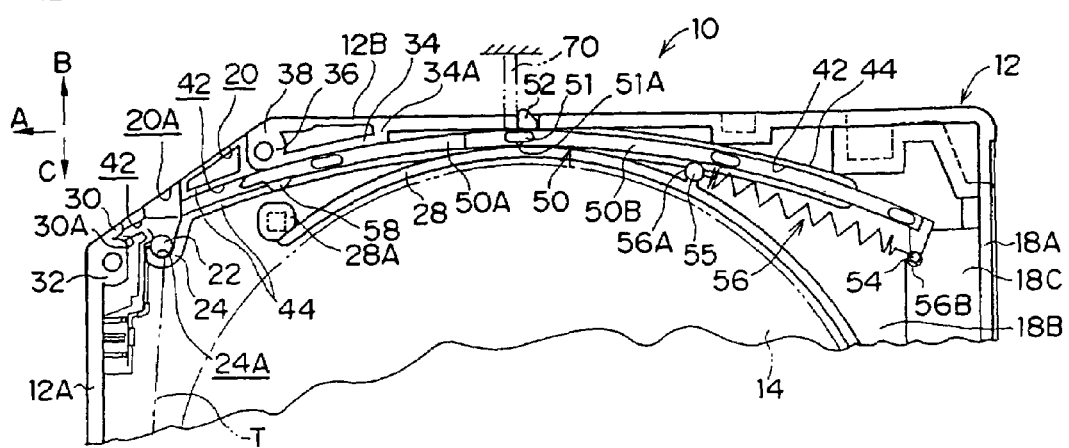
FIG. 5C is a plan view showing a state in which the opening of the opening of the recording tape cartridge of FIG. 5A is complete.

The door 50 described above moves relative to the case 12 in the direction of opening the opening 20, against the urging force of the 56, when the operation projection 52 is engaged with the engaging protrusion 70 of the drive device by an operation of loading the recording tape cartridge 10 into the drive device (see FIGS. 5A to 5C). Further, when the recording tape cartridge 10 is ejected from the drive device, the door 50 of this structure closes the opening 20 consequent to the urging force of the 56.

Thus, the door 50, which is curvedly formed in the circular arc form, rotates so as to swing at the outer side of the reel 14 and the pin stands 24 (and the leader pin 22) without deviating from the movement path along the shape of the curvature, and opens the opening 20, which is angled with respect to the direction of arrow A. Further, the door 50 is a structure that will not protrude beyond an external profile region of the case 12 during opening and closing of the opening 20.

Structure of Label Area

Figure 6:
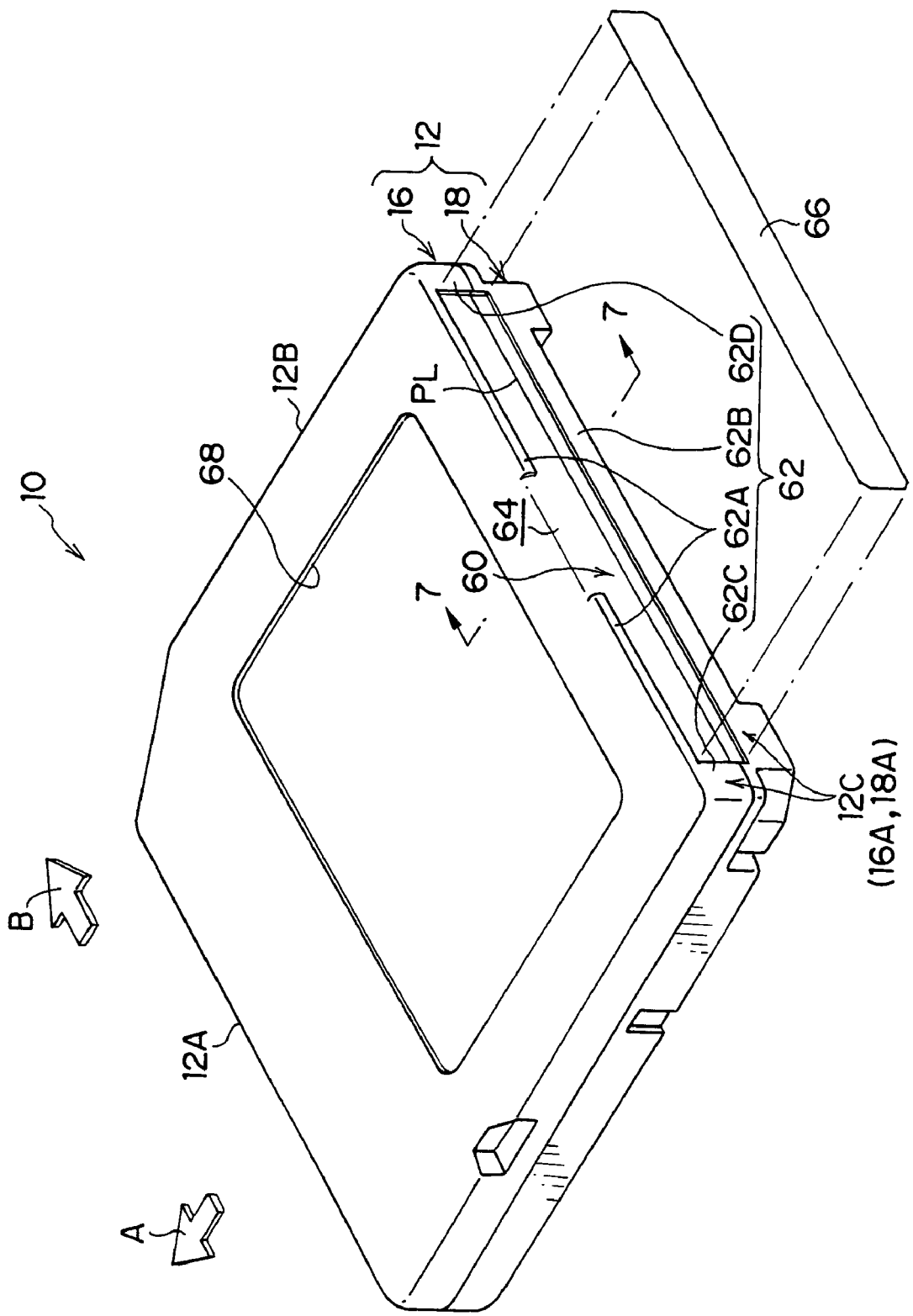
FIG. 6 is a perspective view, viewed from an upper face side, of the recording tape cartridge relating to the embodiment of the present invention.

As shown in FIG. 6, the label area 60 is provided at a rear wall 12C of the case 12 (a wall of the peripheral walls 16A and 18A at a side facing away from the direction of arrow A). The label area 60 is formed in a substantially rectangular shape in rear view, and spans substantially the whole length of the rear wall 12C in a longitudinal direction thereof. A parting line PL is located at a lower portion of the label area 60 in the vertical direction. That is, as shown in FIG. 2, the label area 60 is positioned to extend over the peripheral wall 16A of the upper case 16 and the peripheral wall 18A of the lower case 18.

The label area 60 is surrounded by a standing wall 62, which is formed by depressing (recessing) the label area 60 into an outer face of the rear wall 12C. That is, the label area 60 is provided as a recessed portion in the rear wall 12C, and outer edge portions of the label area 60 are defined by the standing wall 62. As shown in FIGS. 3 and 4, the standing wall 62 is structured by an upper standing wall 62A, a lower standing wall 62B, a left standing wall 62C and a right standing wall 62D.

Figure 7:
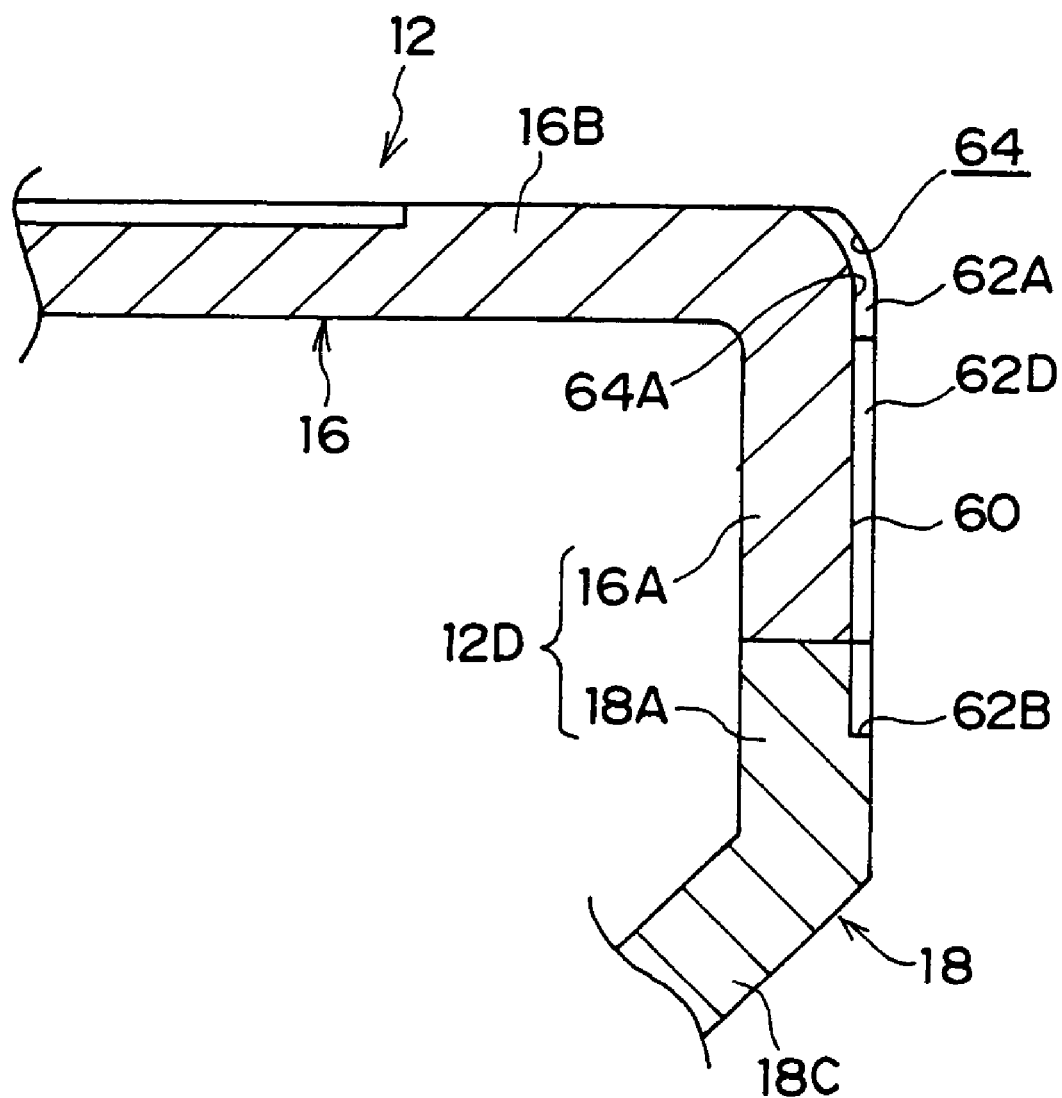
FIG. 7 is a sectional view cut along line 7—7 of FIG. 6.

A longitudinal direction central portion of the upper standing wall 62A of the standing wall 62 is excised along a predetermined length, and this portion serves as a cut-away portion 64. As shown in FIG. 7, the cut-away portion 64 communicates with the label area 60, a floor surface 64A of the cut-away portion 64 is set to be flush with the label area 60, and an upper end portion of the floor surface 64A is made to be a curved end which curves round to the ceiling plate 16B. Thus, the label area 60 opens upward at the cut-away portion 64.

A label 66 (see FIG. 6) may be adhered to the label area 60 described above when required. This label 66 is marked with, for example, details of what is recorded on the magnetic tape T or the like (for example, a title, a date and the like). The label 66 is formed in a rectangular shape which is slightly smaller than the label area 60 in both the left-right direction and the vertical direction.

Next, operation of the present embodiment will be described.

In the recording tape cartridge 10 having the structure described above, the opening 20 is closed by the door 50, which is entered into the recess portion 30A by the urging force of the coil spring 56, when the recording tape cartridge 10 is not in use (e.g., during storage, during transportation, and the like).

When the magnetic tape T is to be used, the recording tape cartridge 10 is loaded into a drive device along the direction of arrow A. In accordance with this loading, the engaging protrusion 70 of the drive device engages with the operation projection 52 of the door 50, and the door 50 rotates substantially rearward and opens the opening 20. The leader pin 22 is drawn out through the opening 20 by a drawing-out mechanism, and is accommodated at a winding reel of the drive device.

Then, the drive device drives the winding reel and the reel 14 to rotate at the same time, and the magnetic tape T is wound round the winding reel while being sequentially drawn out from the case 12. Recording and/or playback of information is carried out by a recording/playback head or the like which is disposed along a predetermined tape path.

Subsequently, when the magnetic tape T has been wound back to the reel 14 and the recording tape cartridge 10 is to be ejected from the drive device, the recording tape cartridge 10 is moved in the direction opposite to the direction of arrow A by the urging force of the coil spring 56 and/or by an unillustrated ejection mechanism. In accordance with this movement, the door 50 closes the opening 20 due to the urging force of the coil spring 56.

The label 66 is adhered to the label area 60 in accordance with requirements. Hence, a user of the recording tape cartridge 10 can confirm general details (e.g., a title, recording date and time, and the like) of information that is recorded on the magnetic tape T, by visual inspection. Here, because the label area 60 is provided at the rear wall 12C of the case 12, the label 66 can be visually observed from the rear face side even, for example, at a time when the recording tape cartridge 10 is being loaded at a drive device, in a state in which the recording tape cartridge 10 is accommodated at a holder portion of a library apparatus, and the like.

Now, the cut-away portion 64 which communicates with the label area 60 is provided at the case 12 by excising a portion of the standing wall 62 surrounding the label area 60. As a result, with this case 12, the label 66 that has been adhered to the label area 60 can be easily peeled off, starting from the cut-away portion 64.

Further, the cut-away portion 64 is provided at a central portion, which is a portion in a longitudinal direction, of the upper standing wall 62A of the standing wall 62. That is, the upper standing wall 62A is not excised and opened up over the whole length thereof. Thus, the rectangle-like label area 60 is enclosed from four sides by the standing wall 62. Accordingly, the label 66 can be accurately positioned within the label area 60.

Furthermore, because the cut-away portion 64 is located at the longitudinal direction central portion of the upper standing wall 62A, which defines a long edge of the label area 60, the cut-away portion 64 can be set to be relatively large in comparison to a structure in which a cut-away portion is provided at a short edge portion, such as, for example, the right standing wall 62D or the like. Accordingly, the label 66 that has been adhered to the label area 60 can be peeled off, away from the cut-away portion 64, more easily.

In particular, because the cut-away portion 64 is provided to be continuous with an upper face of the case 12 (a surface of the ceiling plate 16B) and opens upward, the label 66 that has been adhered to the label area 60 can be peeled off, away from the cut-away portion 64, more easily.

On the other hand, the cut-away portion 64 is distanced from corner portions which are susceptible to peeling of the label 66, which is to say, the cut-away portion 64 is not located at a corner portion of the label area 60 (and the standing wall 62). As a result, unintended peeling of the label 66 is avoided.

Thus, with the recording tape cartridge 10 relating to the present embodiment, peeling off of the label 66 that has been adhered to the label area 60 is easy, while a function of positioning the label 66 at the label area 60 is maintained.

The embodiment described above is a structure in which the cut-away portion 64 is provided to communicate with the label area 60, which is provided at the rear wall 12C of the case 12. However, the present invention is not limited to this structure. For example, a cut-away portion could be provided to communicate with a label area 68 provided at the ceiling plate 16B (see FIG. 6).

Further, the embodiment described above is a preferable structure in which the cut-away portion 64 is provided at a longitudinal direction central portion of the upper standing wall 62A, which defines the upper edge of the label area 60. However, the present invention is not limited to this structure. For example, the cut-away portion 64 could be provided by excising a portion of the lower standing wall 62B, a portion of the left standing wall 62C, a corner portion between the upper standing wall 62A and the right standing wall 62D, etc.

Furthermore, the present embodiment has a structure in which the standing wall 62 (and the label area 60) is formed by depressing the outer face of the rear wall 12C. However, the present invention is not limited to this structure. For example, a rectangular frame-like standing wall (which is partially excised to include a cut-away portion) could be provided protruding from the outer face of the rear wall 12C.

Further yet, with the present embodiment, the recording tape cartridge 10, which accommodates a single reel on which the magnetic tape T is wound in the case 12, is exemplified as an embodiment of the cartridge of the present invention. However, the present invention is not limited to this structure. For example, the cartridge of the present invention may be applied to a "two reel" type recording tape cartridge which accommodates two reels, for winding out and winding up a magnetic tape T, in a case, a disc cartridge which rotatably accommodates a disc-like disc medium, such as an optical disc, a magnetic disc or the like, in a case, and the like. Obviously, structure of a recording tape cartridge to which the present invention is applied is not limited to the recording tape cartridge 10 described above.

What is claimed is:

1. A cartridge comprising:
   a case accommodating a recording medium therein; and
   a label area on a side of the case where a label is to be disposed, the label area being surrounded on each side by a rectangle-like standing wall at an outer face of the case, such that the standing wall extends above the label area,
   wherein a portion in a longitudinal direction of one side portion of the standing wall is excised to provide a cut-away portion, which communicates with the label area, at the case.

2. The cartridge of claim 1, wherein the label area is formed at a rear wall of the case, at a rear side in a direction of loading the case into a drive device, and the cut-away portion is provided at a substantially central portion in the longitudinal direction of an upper side portion of the standing wall.

3. The cartridge of claim 2, wherein the cut-away portion is provided to communicate with an upper face of the case.

4. The cartridge of claim 1, wherein the label area is formed at a rear wall of the case, at a rear side in a direction of loading the case to a drive device, and the cut-away portion is provided at a substantially central portion in the longitudinal direction of a lower side portion of the standing wall.

5. The cartridge of claim 1, wherein the outer face of the case is recessed to form the standing wall.

6. The cartridge of claim 1, wherein the standing wall is formed to be protruded from the outer face of the case.

7. The cartridge of claim 1, wherein the recording medium comprises recording tape wound on at least one reel and the cartridge includes a recording tape cartridge.

8. The cartridge of claim 1, wherein the recording medium comprises a disc medium and the cartridge includes a disc cartridge.

9. The cartridge of claim 1, wherein the case includes an upper case and a lower case, and the label area is formed to extend over the upper case and the lower case.

10. The cartridge of claim 9, wherein a surface area of the label area at the upper case is formed to be greater than a surface area of the label area at the lower case.

11. The cartridge of claim 1, wherein the standing wall is provided on one side of the case.

12. A cartridge comprising:
    a case including an upper case and a lower case and accommodating a recording medium therein; and
    a label area on a side of the case where a label is to be disposed, the label area being surrounded on each side by a rectangle-like standing wall at an outer face of the case, such that the standing wall extends above the label area,
    wherein a portion in a longitudinal direction of one side portion of the standing wall is excised to provide a cut-away portion, which communicates with the label area, at the case.

13. The cartridge of claim 12, wherein the label area is formed to extend over the upper case and the lower case.

14. The cartridge of claim 13, wherein a surface area of the label area at the upper case is formed to be greater than a surface area of the label area at the lower case.

15. The cartridge of claim 12, wherein the label area is formed at a rear wall of the case, at a rear side in a direction of loading the case to a drive device, and the cut-away portion is provided at a substantially central portion in the longitudinal direction of a lower side portion of the standing wall.

16. The cartridge of claim 12, wherein the outer face of the case is recessed to form the standing wall.

17. The cartridge of claim 12, wherein the standing wall is formed to be protruded from the outer face of the case.

18. The cartridge of claim 12, wherein the standing wall is provided on one side of the case.

* * * * *